(12) United States Patent
Marra

(10) Patent No.: US 9,943,800 B2
(45) Date of Patent: Apr. 17, 2018

(54) APPARATUS FOR GAS CLEANING

(71) Applicant: KONINKLIJKE PHILIPS N.V., Eindhoven (NL)

(72) Inventor: Johan Marra, Einhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 307 days.

(21) Appl. No.: 14/379,873

(22) PCT Filed: Feb. 22, 2013

(86) PCT No.: PCT/IB2013/051446
§ 371 (c)(1),
(2) Date: Aug. 20, 2014

(87) PCT Pub. No.: WO2013/128350
PCT Pub. Date: Sep. 6, 2013

(65) Prior Publication Data
US 2016/0166974 A1    Jun. 16, 2016

Related U.S. Application Data

(60) Provisional application No. 61/604,027, filed on Feb. 28, 2012.

(51) Int. Cl.
*B01D 47/00* (2006.01)
*B01D 53/14* (2006.01)
(Continued)

(52) U.S. Cl.
CPC ......... *B01D 53/1412* (2013.01); *B01D 47/14* (2013.01); *B01D 53/78* (2013.01);
(Continued)

(58) Field of Classification Search
None
See application file for complete search history.

(56) References Cited

U.S. PATENT DOCUMENTS

| 3,820,308 A | 6/1974 | Onuki |
| 4,443,354 A | 4/1984 | Eian |

(Continued)

FOREIGN PATENT DOCUMENTS

| EP | 1792647 A1 | 6/2007 |
| JP | 04363528 A | 12/1992 |

(Continued)

OTHER PUBLICATIONS

Translation of JP2001252341A.*

*Primary Examiner* — Amber R Orlando
*Assistant Examiner* — Phillip Y Shao

(57) ABSTRACT

The invention proposes an apparatus for gas cleaning having a high gas cleaning efficiency at any relative humidity. The apparatus comprises a passage (10) for gas flow; a hydrophilic carrier (12) permeable for gas flow, at least part of which is positioned within said passage for gas flow, and configured for containing a reagent that contacts the gas in said passage for gas flow; a unit (14) for disposing liquid to said carrier; and a controller (16), associated with said unit for disposing liquid, configured for controlling the unit for disposing to dispose an aqueous solution of dissolved reagent to the carrier; and after that controlling the unit for disposing to dispose liquid in case the humidity of the gas is below a first humidity threshold, or to stop disposing liquid in case the humidity of the gas is above a second humidity threshold.

10 Claims, 2 Drawing Sheets

(51) Int. Cl.
  *B01D 53/78* (2006.01)
  *F24F 3/16* (2006.01)
  *F24F 11/00* (2018.01)
  *B01D 47/14* (2006.01)
  *B01D 53/34* (2006.01)

(52) U.S. Cl.
  CPC ............ *F24F 3/16* (2013.01); *F24F 11/0015* (2013.01); *B01D 53/346* (2013.01); *B01D 2247/04* (2013.01); *B01D 2247/08* (2013.01); *B01D 2251/2067* (2013.01); *B01D 2251/304* (2013.01); *B01D 2251/306* (2013.01); *B01D 2251/606* (2013.01); *B01D 2252/204* (2013.01); *B01D 2252/205* (2013.01); *B01D 2257/302* (2013.01); *B01D 2257/406* (2013.01); *B01D 2257/702* (2013.01); *F24F 2003/1617* (2013.01); *F24F 2003/1621* (2013.01); *F24F 2011/0032* (2013.01); *Y02B 30/78* (2013.01)

(56) References Cited

U.S. PATENT DOCUMENTS

| | | | |
|---|---|---|---|
| 5,531,801 A | | 7/1996 | Sewell |
| 6,071,479 A | | 6/2000 | Marra |
| 6,083,393 A | * | 7/2000 | Wu ............ B01D 67/0006 210/500.27 |
| 2008/0058440 A1 | * | 3/2008 | Muller ............ B01D 67/0093 522/109 |
| 2008/0237035 A1 | | 10/2008 | Kurusu |
| 2010/0124524 A1 | | 5/2010 | Green |

FOREIGN PATENT DOCUMENTS

| | | | |
|---|---|---|---|
| JP | 08206183 A | | 8/1996 |
| JP | 2001252341 A | * | 9/2001 |
| JP | 2001252521 A | | 9/2001 |
| JP | 2007068612 A | | 3/2007 |
| WO | 2006026517 A2 | | 3/2006 |
| WO | 2010073217 A1 | | 7/2010 |

* cited by examiner

APPARATUS FOR GAS CLEANING

This application is the U.S. National Phase application under 35 U.S.C. § 371 of International Application No. PCT/IB2013/051446, filed on Feb. 22, 2013, which claims the benefit of U.S. Provisional Application No. 61/604,027 filed on Feb. 28, 2012. These applications are hereby incorporated by reference herein.

TECHNICAL FIELD

The disclosure relates to the field of gas cleaning.

BACKGROUND ART

Indoor air pollution is a known and persistent problem that affects people's health and well-being. A particular issue is the indoor air pollution with formaldehyde gas. For instance, the indoor air in many places suffers from formaldehyde pollution due to the widespread unregulated use of low-cost building and decoration materials comprising urea-formaldehyde resins. Adequate ventilation with outdoor air is a good remedy to remove the formaldehyde pollution. But the mechanical ventilation with filtered and temperature-conditioned outdoor air is only rarely encountered in common homes and apartments which mostly rely on natural ventilation. Natural ventilation becomes less desirable in case the outdoor air is polluted. Furthermore, people tend to minimize the natural ventilation level anyway when the outdoor temperature is uncomfortable.

Formaldehyde can be removed from air through the use of chemically-impregnated filters. These filters comprise specific impregnated reagents that exhibit specific chemical or physical interactions with target gaseous pollutants such as formaldehyde, so as to remove formaldehyde from air. Considering other target gaseous pollutants, such as acidic gases (e.g., $HNO_x$, $SO_2$, organic acids) or alkaline gases (e.g., $NH_3$, amines), corresponding alkaline or acidic reagents, respectively, can be used for their removal from air.

SUMMARY OF THE INVENTION

The drawback of the air cleaning solution by means of impregnated reagents is that the cleaning efficiency markedly decreases when the relative humidity RH is below (<)40%-50% and becomes substantially zero when RH≤30%. An indoor humidity RH≤30%-40% is not uncommon in winter. The reason for the decreasing air cleaning efficiency with decreasing RH is that the absorption activity and/or chemical activity of the reagents necessitates the reagents to comprise a certain minimum amount of bound hydration water, while the amount of bound hydration water from air decreases with decreasing RH.

To solve this problem, a humidifier can be used to increase the indoor RH. This increases the amount of water that is absorbed by the reagents and thus also their ability to absorb and/or react with specific gaseous pollutants in air. The reagents also exhibit high absorption efficiency towards specific gaseous target pollutants when the reagents are dissolved in water and the aqueous reagent solution is brought into contact with polluted air. This absorption is particularly efficient when the target gaseous pollutants also exhibit a high solubility in pure water. The humidifier is usually implemented by nebulisers or evaporators.

However, the use of a nebuliser may cause the deposition of a fine white dust throughout the room, while the use of an evaporator comprising a moistened wick or pad is hampered by scale formation in/on the wick/pad, which quickly reduces and eventually almost nullifies its effectiveness. Additionally, undesirable growth of microbiological species in the water used for air humidification is a recurring problem requiring special attention and/or the application of biocidal agents for safeguarding the hygiene. The combination of air cleaning and air humidification in single recirculation-type indoor air treatment appliances has been attempted, for instance in some air treatment products sold by companies like YADU, Venta, and Sharp. But at an airflow of more than 100 $m^3$/hr through the appliance, their performance is relatively poor, both with respect to their one-pass humidifying efficiency and with respect to their one-pass air cleaning efficiency towards gases like formaldehyde. The reason is the highly pragmatic construction of these appliances and the unfavorable process conditions therein. Another drawback of these appliances is that they always add moisture to the air during air cleaning, even when this is no longer desirable in case the relative humidity of the air is above 40-60%.

As yet, no small-sized air treatment appliances exist that enable efficient air cleaning, e.g., achieving a one-pass efficiency of more than 80% at airflows up to 200-300 $m^3$/hr, with respect to formaldehyde across a wide humidity range, e.g., the full range 0%≤RH≤100%, and which is, optionally, also able to simultaneously humidify the air when its relative humidity is low, while not inducing a further rise in the relative humidity of the air when its relative humidity is high.

Given the above drawbacks in the art, it would be advantageous to achieve efficient gas cleaning irrespective of the humidity of the gas.

According to one aspect of the invention, an apparatus is provided for gas cleaning, the apparatus comprises:

a passage (10) for gas flow;

a hydrophilic carrier (12) permeable for gas flow, at least part of which is positioned within said passage for gas flow and configured for containing a reagent that contacts the gas in said passage for gas flow;

a unit (14) for disposing liquid to said carrier; and a controller (16), associated with said unit for disposing, configured for:

controlling the unit for disposing to dispose an aqueous solution of dissolved reagent to the carrier; and after that controlling the unit for disposing to dispose liquid in case the humidity of the gas entering said carrier is below a first humidity threshold, or to stop disposing liquid in case the humidity of the gas entering said carrier is above a second humidity threshold.

In this aspect, the apparatus for gas cleaning can dispose on the carrier an aqueous solution of a specific chemical reagent capable of absorbing a target gaseous pollutant from the gas, thereby removing the target gaseous pollutant from the gas and thus cleaning the gas. With regard to gas possessing a low humidity, the apparatus disposes liquid to the carrier and thus provides the gas with moisture, thereby increasing the humidity of the gas and simultaneously cleaning the gas from the target gaseous pollutant with a good efficiency. With regard to gas possessing a high humidity, the addition of more moisture to the gas will stop after the disposing of liquid has stopped and all residual water in the carrier has evaporated. However, gas cleaning is then still possible with a high efficiency when a hygroscopic reagent capable of absorbing a target gaseous pollutant from the gas remains in the carrier after all residual water in the carrier that is not hygroscopically bound to the reagent has evaporated. In this aspect, the apparatus for gas cleaning achieves a good cleaning efficiency under conditions of both low and high humidity of the gas, while being enabled to additionally humidify the gas only under conditions of low humidity in the gas.

According to an embodiment of the invention, the apparatus is provided with a user interface (UI) through which the user can manually set the first and/or second humidity threshold.

According to an embodiment, the apparatus for gas cleaning further comprises a unit for activating gas flow through said passage.

In this embodiment, the volumetric gas flow through the apparatus is increased, thus improving the gas cleaning rate.

In an embodiment, the apparatus for gas cleaning further comprises: a humidity sensor associated with said controller, the humidity sensor being at least partly disposed within the passage for gas flow. In an embodiment, the humidity sensor is positioned on the upstream side of the carrier where the gas flow through the passage enters the carrier.

In this embodiment, the humidity of the gas entering the carrier can be accurately measured, thus whether or not to dispose liquid can be determined accurately according to the measured humidity of the gas entering the carrier. The determination can, additionally or alternatively, be based on comparing the concentrations of a gaseous pollutant such as formaldehyde in the gas upstream and downstream of the carrier, respectively. That is, if the difference between these concentrations is negligible, the reagent on the carrier has to be renewed by disposing liquid (e.g., solution of the reagent) again.

In an embodiment, the humidity sensor measures the relative humidity of the gas entering the carrier, and the first and second humidity thresholds are chosen at a relative humidity value between 40% and 60%.

In this embodiment, a range for the first and second relative humidity thresholds is given and this range ensures that the humidity of the gas entering the carrier does not become too high.

In an embodiment, the apparatus for gas cleaning comprises:
a timer associated with the controller;
the controller is configured to trigger the unit for disposing to resume the disposal of the aqueous solution of dissolved reagent for a certain period of time, after a period of time has elapsed since the last disposal of the aqueous solution of the dissolved reagent.

Due to this configuration, it is ensured that the reagent in the carrier becomes periodically flushed away and replaced with fresh reagent, also under conditions wherein the humidity of the gas is high. This regenerates the gas cleaning functionality of the carrier and prevents a gradual deterioration of the gas cleaning efficiency due to gradual inactivation of the reagent in the carrier.

In an embodiment, the disposing rate of the aqueous solution of dissolved reagent of the unit for disposing is not less than the rate of evaporation of the liquid on the carrier.

In this embodiment, it is ensured that the carrier positioned in the passage remains wetted with a surplus of liquid, thereby allowing for continuous liquid drainage from the carrier and thus a continuous flushing and regeneration of the reagent in the carrier, thereby improving the gas cleaning efficiency.

In an embodiment, the unit for disposing comprises:
a container for containing the solution;
a manifold in liquid communication with the container, wherein at least part of the manifold is positioned above the carrier, the manifold featuring at least one aperture for enabling the disposing of the solution from the manifold onto the carrier.

This embodiment proposes one specific structure for the unit for disposing the aqueous solution of dissolved reagent.

According to one embodiment, the unit for disposing liquid further comprises:
a collector, positioned below the carrier and in liquid communication with the container.

In this embodiment, the surplus solution of dissolved reagent can be drained from the carrier into the collector from where it can be transported to the container. This allows for a continuous re-cycling of the solution of dissolved reagent and thus a maximization of the humidification rate and the gas cleaning efficiency.

In an embodiment, the controller controls the unit for disposing to keep disposing water or the aqueous solution of dissolved reagent in case the humidity of the gas is below the first humidity threshold. In case the gas entering the carrier has a RH below the first humidity threshold, the unit for disposing is controlled such as to ensure that the carrier positioned in the passage for gas flow remains substantially wetted, thereby enabling gas cleaning by contacting the gas in the wetted carrier with the solution in and on the carrier.

In an embodiment, the carrier features a gas-permeable corrugated structure comprising:
alternately stacked wave layers and flat layers, the stacked neighboring wave layer and flat layer giving rise to the formation of a plurality of channels through which gas flow occurs, the channels extending in a horizontal direction through the carrier, the channel diameter is between 0.5 mm and 2 mm.

The embodiment proposes one specific structure for the carrier. The channels formed by the wave layer and flat layer create a large contact area between the gas in the carrier and the reagent in and on the channel walls, thus allowing for a high gas cleaning efficiency.

According to one embodiment, said wave layer and/or said flat layer is composed of a hydrophilic fibrous sheet material, the weight of the hydrophilic fibrous sheet material being in the range 20-100 gram/m$^2$.

The embodiment proposes a more advantageous structure of the carrier wherein the dissolved reagent or the precipitated reagent can now be retained in the carrier by means of capillary forces.

In an embodiment, the carrier is partitioned into different sections by vertically-positioned support plates. This is useful for separating the wetting- or drying-induced dimensional changes (such as shrinkage) in one part of the carrier from similar dimensional changes in other parts of the carrier, thereby avoiding the formation of additional gas passages at random locations in the carrier that may act as large by-passes for the gas wherein little or no gas cleaning occurs.

In one embodiment, the horizontal spacing between neighboring support plates falls in the range between 40 mm and 80 mm.

In this embodiment, by limiting the width of part of the carrier partitioned by the support plates, the size of the openings formed by the drying-induced shrinkage of the hydrophilic fibrous sheet material remains limited. Therefore, the high cleaning efficiency remains ensured.

These and other features of the present invention will be described in detail in the embodiment part.

BRIEF DESCRIPTION OF THE DRAWINGS

Features, aspects and advantages of the present invention will become obvious by reading the following description of non-limiting embodiments with the aid of appended drawings.

Wherein the same or a similar reference sign refers to the same or a similar component.

DETAILED DESCRIPTION OF EMBODIMENTS

The invention proposes an apparatus for gas cleaning, comprising:
a passage for gas flow;
a hydrophilic carrier permeable for gas flow, at least part of which is positioned within said passage for gas flow and configured for containing a reagent that contacts the gas in said passage for gas flow;
a unit for disposing liquid to said carrier; and
a controller, associated with said unit for disposing liquid, configured for:
controlling the unit for disposing to dispose an aqueous solution of dissolved reagent to the carrier; and after that
controlling the unit for disposing to dispose liquid in case the humidity of the gas is below a first humidity threshold, or to stop disposing liquid in case the humidity of the gas is above a second humidity threshold.

Figure 1:
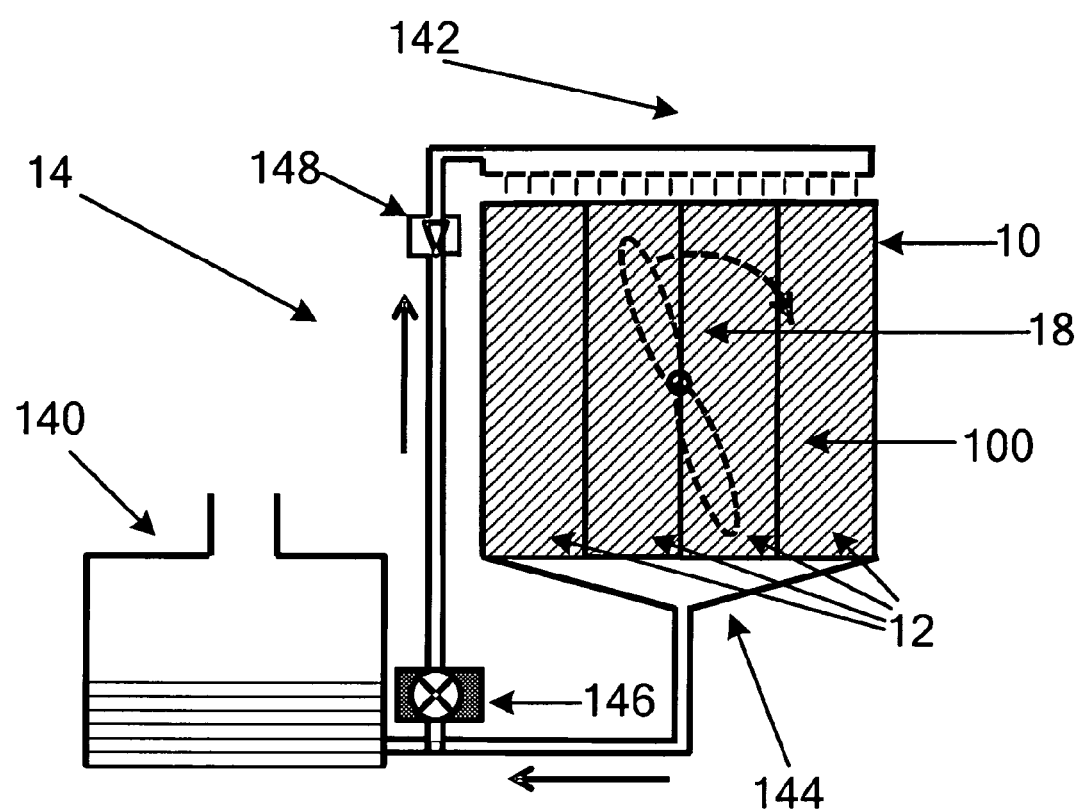
FIG. 1 shows the schematic view of the apparatus for gas cleaning in an embodiment of the invention.

FIG. 1 shows the schematic view of the apparatus for gas cleaning in an embodiment of the invention. It is a cross sectional view of the apparatus for gas cleaning, which comprises:
a passage 10 for gas flow;
a hydrophilic carrier 12 permeable for gas flow, which is positioned within the passage 10 and configured for containing a reagent that contacts the gas in the passage 10;
a unit 14 for disposing liquid to the carrier 12. The unit 14 is controlled to dispose an aqueous solution of dissolved reagent to the carrier 12. Preferably, to re-cycle the solution of reagent, as shown in FIG. 1, the unit 14 comprises a container 140 for containing the solution of reagent, a manifold 142 in liquid communication with the container 140, wherein at least part of the manifold 142 is positioned above the carrier 12 and has at least one aperture for enabling the disposing of the solution from the manifold 142 onto the carrier 12, and a collector 144, positioned below the carrier 12 and in liquid communication with the container 140. Still preferably, the container 140 and the manifold 142 are connected in liquid communication by a pump 146 and a non-return valve 148;
a unit 18 for activating gas flow through the passage 10. Preferably, as shown in FIG. 1, the unit 18 is implemented by a fan blade and a motor driving the blade to rotate. The fan blade is positioned vertically in the passage 10.

The apparatus for gas cleaning further comprises a controller 16 in association with the unit 14 and capable of controlling the unit 14; a humidity sensor 20, in association with the controller 16 and at least partly disposed within the passage for gas flow. FIG. 1 docs not show these two components.

Next, the operating procedure of the apparatus for gas cleaning will be elucidated.

First, the controller 16 controls the unit 14 for disposing to dispose an aqueous solution of dissolved reagent to the carrier 12.

Specifically, dissolved reagents such as acids (citric acid, phosphorous acid, phosphoric acid, etc.) in the solution specifically bind with gaseous alkaline pollutants such as $NH_3$ and organic amines through acid-base interactions. Similarly, dissolved reagents such as carbonate and/or bicarbonate species ($K_2CO_3$, $KHCO_3$, $Na_2CO_3$, $NaHCO_3$) in the solution specifically bind with gaseous acidic pollutants such as $SO_2$, $HNO_x$, and organic acids through acid-base interactions. Dissolved reagent species such as tris-hydroxymethyl-aminomethane, urea and alkanolamines absorb low-molecular-weight aldehyde gases, such as formaldehyde, through a chemical condensation reaction. Thus, suitable reagents can be chosen according to the type of the gaseous pollutant to be removed from the gas. Alternatively, the reagent can be a mixture of reagents respectively for the acid pollutant gas, the alkaline pollutant gas and the aldehyde pollutant gas. One composition of the reagent solution, for cleaning the gas from formaldehyde and acidic gases, is a mixture of an alkanolamine, an alkaline agent and a humectant (a moisturizing agent). Wherein:

The alkanolamine is tris-hydroxymethyl-aminomethane.

The alkaline agent in a mixture of $K_2CO_3$ and $KHCO_3$.

The humectant is potassium formate ($KHCO_2$).

In an embodiment, the container 140 contains an aqueous solution of reagent. When preparing the solution of reagent, the customer can mix solid reagent with tap water in the container 140, thereby enabling the reagent to become dissolved in the tap water and form the aqueous solution of reagent. In this procedure, ions from the reagent in the water can react with certain ions in the tap water and generate insoluble species, for example those generated by the reaction of $HCO_3^-$ and the water hardness ions $Ca^{2+}$ and $Mg^{2+}$. These insoluble species precipitate inside the container 140 instead of in the manifold 142 or on the carrier 12 and can be easily cleaned from the container 140 by washing the container 140. By configuring a filter at the outlet of the container 140 to the manifold 142, the precipitated species are prevented from reaching the manifold 142 and the carrier 12 with the water flow. Thus the manifold 142 and the carrier 12 will then not become contaminated by the precipitated species, and an enduring performance of the apparatus and its cleaning efficiency is ensured.

In the embodiments shown in FIG. 1, during the providing of the solution to the carrier, the pump 146 can pump the solution in the container 140 to the manifold 142 via the non-return valve 144. Then, the solution of reagent in the manifold 142 drains through the apertures, such as small openings, and drops onto the carrier 12, thereby disposing the solution of reagent to the carrier.

Meanwhile or after the solution of the reagent has been disposed, the unit 18 activates the gas flow through the passage 10. In the embodiment shown in FIG. 1, the motor rotates the fan blade to create horizontal gas flow, i.e. perpendicular to the plane of the document page. It should be noted that the direction of the gas flow is not limited and it can also be vertical. Besides, natural ventilation or external ventilation can also be used to create gas flow through the passage 10, and in those cases the apparatus for gas cleaning does not necessarily contain the unit 18.

The humidity sensor 20 measures the humidity of the gas flowing through the passage 10, and delivers the measurement to the controller 16. In an embodiment, the humidity sensor 20 is positioned on the upstream side of the carrier 12 where the gas enters the carrier 12, and the humidity of un-cleaned gas can be measured accurately. In another embodiment, the humidity sensor 20 can also be positioned on the external housing of the apparatus, to measure the humidity of the gas in the environment. It should also be noted that the apparatus does not necessarily contain the humidity sensor 20. Instead, the apparatus can receive the humidity measurement from an external humidity sensor via for example an interface.

Then, the controller 16 compares the humidity of the gas with a humidity threshold. Preferably, the humidity is the relative humidity of the gas, and the humidity threshold is chosen at a relative humidity value between 40% and 60%. To be more specific, the humidity threshold can also be chosen according to the minimum relative humidity required by the reagent for being able to efficiently react with the gaseous target pollutant in the gas.

● When the controller 16 determines that the humidity of the gas entering the carrier is below a first humidity threshold, it activates the unit 14 for disposing to dispose liquid to the carrier 12. The liquid is then irrigated onto the carrier 12, thereby enabling the liquid to become drawn into the carrier by gravity and/or capillary forces which eventually wet the entire carrier 12 with the previously disposed reagent. This operation mode can be called "wet-mode" operation, and it can be preferably implemented by the following two embodiments:

Embodiment I

The liquid provided by the unit 14 to the carrier 12 is also the aqueous solution of the reagent that exhibits a physical or chemical reaction with the gaseous target pollutant, while the solvent can be water. When the gas with a low humidity passes through the carrier 12 that is wetted by the reagent solution, the gas becomes humidified through water evaporation from the wetted carrier surfaces. The gaseous pollutant that is soluble in water will at least partly dissolve in the reagent solution comprised in and on the carrier. The dissolved gaseous pollutant can then become strongly bound by the reagent in the solution through a chemical reaction or physical interaction, thereby enabling its removal from the gas.

Embodiment II

The unit 14 is provided with an inlet of tap water, and is controlled by the controller 16 to dispose water to the carrier 12. The water joins into the previously disposed solution of the reagent. When the gas with low humidity enters the carrier, the gas becomes humidified by the solution. The gaseous pollutant that is soluble in water will at least partly dissolve in the aqueous reagent solution contained in the carrier. The gaseous pollutant becomes thereby removed from the gas by reacting with the reagent in the aqueous reagent solution.

Besides reacting with the reagent, the pollutant gas is also at least partially dissolved in the solution, which also contributes to the gas cleaning.

In these embodiments, the apparatus for gas cleaning not only cleans the gas but also humidifies the gas.

● When the controller 16 determines that the humidity of the gas entering the carrier is above a second humidity threshold, the controller 14 triggers the unit 14 for disposing to stop disposing the liquid to the carrier 12. The low-humidity gas, which remains flowing through the permeable carrier 12, will then quickly dry the carrier 12 by means of water evaporation into the flowing gas. Any initially disposed dissolved reagent in the water will precipitate during the drying process on and into the carrier surfaces and is thereby retained in the carrier. Because the gas passing through the carrier has a sufficiently high humidity above the second humidity threshold, the reagent retained in the carrier remains sufficiently hydrated to specifically react with target gaseous pollutants in the gas. The reaction between reagent and target gaseous pollutant leads to gas cleaning. This operation mode, wherein no liquid is disposed to the carrier 12 while gas is still being cleaned during its residence time in the carrier, can be called "dry-mode operation".

Generally, the available active reagent becomes partly consumed after having reacted with a certain amount of the gaseous pollutant. This leads to a gradual reduction in the overall gas cleaning efficiency of the apparatus 14. In the above embodiment I in "wet-mode", the unit 14 continuously disposes solution of reagent onto the carrier, thus active fresh reagent is always available on the carrier 12. In the embodiment II in "wet mode" and in the "dry-mode", however, since the unit 14 has stopped disposing the solution of reagent, the reagent on the carrier 12 may eventually lose its reactivity and the cleaning efficiency becomes decreased.

To solve this problem, in an embodiment, the apparatus for gas cleaning further comprises a timer 22 in association with the controller 16. The controller 16 is configured to trigger the unit 14 for disposing to dispose solution of reagent to the carrier 12 after a period of time has elapsed since the last stop of the disposal of the aqueous solution of the dissolved reagent. This period of time can be determined by conducting an experiment in advance to determine for how long the reagent maintains its activity.

After a certain period of the disposal of liquid reagent solution to the carrier, the controller 16 triggers the unit 14 to stop disposing the solution of reagent. This finite period of liquid reagent disposal to the carrier, i.e. the act of temporarily flushing the carrier with liquid reagent, can be determined by conducting an experiment in advance to determine how long it takes to completely flush the carrier with fresh active liquid reagent.

Preferably, in the above "wet-mode", or in the above flushing operation in the "dry-mode", the rate of the disposal of the solution of reagent of the unit 14 exceeds the rate of evaporation of the liquid from the carrier 12. This ensures the presence of a surplus of liquid reagent in the carrier and therefore a continuous liquid drainage from the carrier 12 and thus a continuous exchange of reagent on and in the carrier 12.

The collector 144 can collect the drained liquid reagent with reduced activity from the carrier 12, and delivers it back to the container 140 for recycling the reagent.

The customer can eventually discard the solution of reagent in the container 140, either periodically or by the indication from an indicator that the reagent solution has lost most or all of its activity. After discarding the used solution of reagent from the container 140, it can be refilled with fresh solution of reagent. The carrier 12 never needs replacement, which is quite convenient for the customer.

Figure 2:
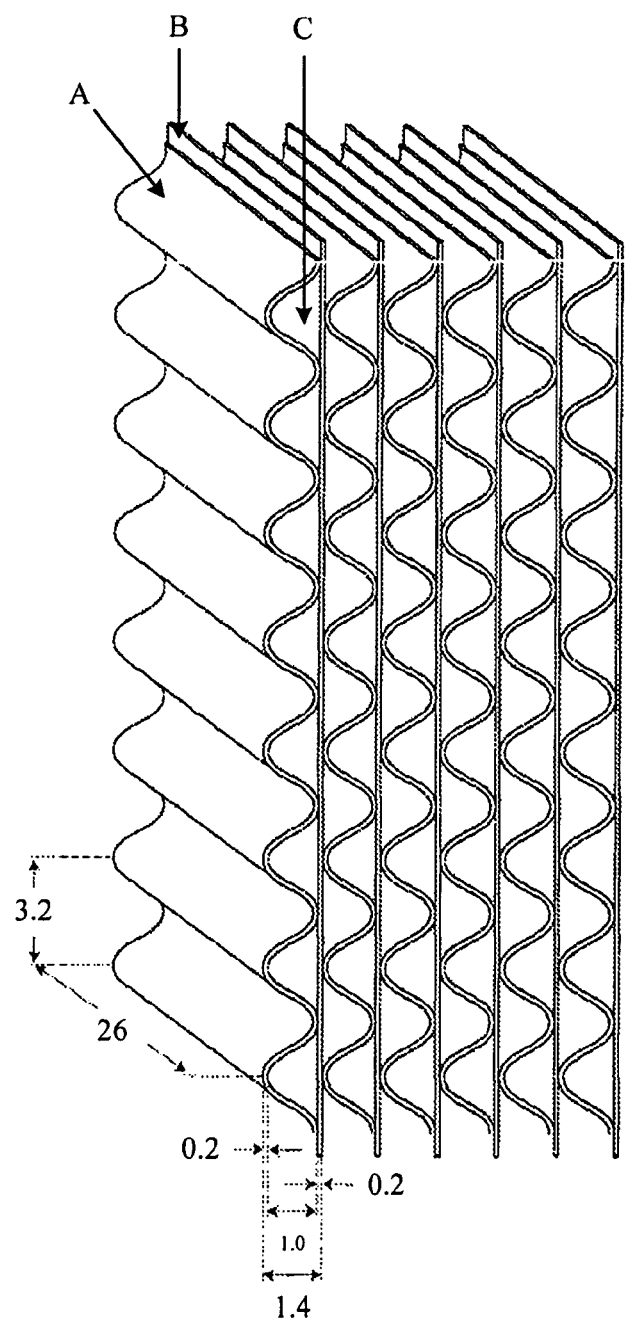
FIG. 2 shows the layer structure of a carrier embodiment used for the apparatus for gas cleaning.

The hydrophilic carrier 12 can be made of various materials and made in various structures. This disclosure gives one example. As shown in FIG. 2, the carrier 12 comprises alternately stacked wave layers A and flat layers B, the stacked neighboring wave layer A and flat layer B giving rise to the formation of a plurality of channels C through which gas flow occurs. The preferable sizes of each portion of the carrier are noted in FIG. 2, and the unit is mm. In case that the gas flow activated by the unit 18 is horizontal, the channels C extend in a horizontal direction through the carrier 12. Preferably, the wave layer A and the flat layer B are oriented vertically, as shown in FIG. 2. In this case, the liquid dropping down from the manifold 142 above the carrier 12 can naturally and evenly spread over and through the wave layer A and the flat layer B, via the effects of gravity and capillarity, thus spreading over and through all the walls of the channels C.

Preferably, the channel diameter is between 0.5 mm and 2 mm. In this range, both a high cleaning efficiency and the existence of only a low pressure drop accompanying the gas flow through the channels in the carrier are guaranteed.

Preferably, the wave layer A and/or the flat layer B are composed of a hydrophilic fibrous sheet material, and the weight of the hydrophilic fibrous sheet material being in the range 20-100 gram/m$^2$. An example of a suitable hydrophilic fibrous sheet material is crepe paper.

Drying occurs when the initially fully wetted hydrophilic fibrous sheet material is exposed to gas flow when there is no continuous liquid disposing. In the embodiment, after liquid reagent is disposed, the unit 14 can stop disposing the liquid reagent when the humidity of the gas is high or after the reagent in the carrier has been regenerated through a periodic flushing of the carrier with fresh reagent liquid. The water on and in the carrier is then allowed to evaporate, causing the carrier 12 to dry. The hydrophilic fibrous sheet material tends to shrink by a few percent in all directions when it dries, particular so when the sheet material only contains a limited amount of reagent. Shrinkage can lead to the formation of extra (large) openings at random locations in the carrier 12 through which gas can escape without having been properly exposed to reagent in the carrier. To overcome this problem, the carrier 12 is partitioned by vertically-positioned support plates 100 into sections, and the support plates 100 are used for separating the shrinkage in one partitioned part of the carrier 12 from the shrinkages in other partitioned parts of the carrier 12, thereby preventing the formation of excessively large openings. Therefore, the overall cleaning efficiency is ensured.

In one still embodiment, the horizontal width of the part of the carrier 12 partitioned by neighboring support plates 100 falls in the range between 40 mm and 80 mm.

In this embodiment, by limiting the width of part of the carrier 12 partitioned by the support plates 100, the size of the openings formed by the shrinkage of the hydrophilic fibrous sheet material remains limited. Therefore, the cleaning efficiency is ensured.

From the viewpoint of practicing the disclosure, the controller 16 can be implemented by a MCU in connection with the pump 146. The controller 16 controls the pump 146 and determines whether or not to pump solution of reagent, and thus controls the unit 14 to dispose or stop disposing the solution of reagent to the carrier 12.

Those ordinary skilled in the art could understand and realize modifications to the disclosed embodiments, through studying the description, drawings and appended claims. All such modifications which do not depart from the spirit of the invention are intended to be included within the scope of the appended claims. The word "comprising" does not exclude the presence of elements or steps not listed in a claim or in the description. The word "a" or "an" preceding an element does not exclude the presence of a plurality of such elements. In the practice of present invention, several technical features in the claim can be embodied by one component. In the claims, any reference signs placed between parentheses shall not be construed as limiting the claim.

What is claimed is:

1. An apparatus for gas cleaning, comprising:
   a passage for gas flow;
   a hydrophilic carrier permeable for gas flow, at least part of which is positioned within said passage for gas flow and configured for containing a reagent that contacts the gas in said passage for gas flow;
   a unit for disposing liquid to said carrier; and
   a controller, associated with said unit for disposing, configured for:
      controlling the unit to dispose an aqueous solution of dissolved reagent to the carrier; and after that
      controlling the unit to dispose liquid in case the humidity of the gas entering said carrier is below a first humidity threshold, or to stop disposing liquid in case the humidity of the gas entering said carrier is above a second humidity threshold.

2. An apparatus for gas cleaning according to claim 1, further comprising:
   a unit for activating gas flow through said passage.

3. An apparatus for gas cleaning according to claim 1, further comprising:
   a humidity sensor associated with said controller, the humidity sensor being at least partly disposed within the passage for gas flow.

4. An apparatus for gas cleaning according to claim 3, wherein said humidity sensor is positioned on the upstream side of the carrier where the gas flow through the passage enters the carrier.

5. An apparatus for gas cleaning according to claim 4, wherein the humidity sensor measures the relative humidity of the gas entering the carrier, and the first and the second humidity thresholds are chosen at a relative humidity value between 40% and 60%.

6. An apparatus for gas cleaning according to claim 1, further comprising:
   a timer associated with said controller;
      the controller is configured to trigger the unit for disposing to resume the disposal of the aqueous solution of dissolved reagent for a certain period of time, after a period of time has elapsed since the last disposal of the aqueous solution of the dissolved reagent.

7. An apparatus for gas cleaning according to claim 6, wherein the disposing rate of the aqueous solution of dissolved reagent of the unit for disposing is not less than the rate of evaporation of the liquid on the carrier.

8. An apparatus for gas cleaning according to claim 1, wherein the unit for disposing comprises:
   a container for containing the solution;
   a manifold in liquid communication with the container, wherein at least part of the manifold is positioned above the carrier, the manifold featuring at least one aperture for enabling the disposing of the solution from the manifold onto the carrier.

9. An apparatus for gas cleaning according to claim 8, wherein the unit for disposing further comprises:
   a collector, positioned below the carrier and in liquid communication with the container.

10. An apparatus for gas cleaning according to claim 1, wherein, the controller is for controlling the unit for disposing to keep disposing water or the aqueous solution of dissolved reagent in case the humidity of the gas is below the first humidity threshold.

* * * * *